Patented Nov. 25, 1930

1,782,841

UNITED STATES PATENT OFFICE

CARL E. CARSTENS, OF ANACONDA, MONTANA, ASSIGNOR TO ANACONDA COPPER MINING COMPANY, OF ANACONDA, MONTANA, A CORPORATION OF MONTANA

TREATING COPPER ORES PREPARATORY TO LEACHING

No Drawing. Application filed August 17, 1925. Serial No. 50,873.

The invention relates to the hydrometallurgy of copper and more particularly to the treatment of copper ores preparatory to percolation-leaching.

Oxid ores of copper which are to be treated by the percolation-leaching process must be crushed to some degree of fineness which will permit the leaching solutions to act on the copper minerals with such facility as to make possible a commercial recovery of the copper in a reasonable time. When such ores are crushed to the fineness required, part of the ore is invariably reduced to fines. For example, when a certain ore is crushed so that it will all pass a screen of half-inch mesh the product will vary in size from one-half inch to minus two hundred mesh. There may be five percent of the minus two hundred mesh portion in the product.

When the crushed ore, including the fines, is charged dry into a leaching tank in the customary way, segregation of the fines usually occurs. The leaching solutions will not percolate through the segregated areas of fines as readily as through the coarser ores, and as a result there occur zones of partly leached ore. If the fines can be distributed uniformly throughout the charge, even percolation and satisfactory recovery of the copper can be attained.

An object of the present invention is to treat the ores preparatory to percolation-leaching so that the fines resulting from the crushing operation will not segregate but will become uniformly distributed throughout the charge.

I have discovered that if the ore is properly moistened prior to leaching, the fines become agglomerated, and uniformly attached, to the coarser particles. For example, it has been found that when ores are moistened with from four to five percent by weight of water the fines will distribute evenly upon being charged into a leaching tank and that even percolation and good recoveries result.

The amount of water required to provide the proper moisture content may vary of course within reasonable limits, but with copper ores carrying the average amount of fines I have obtained very good results with proportions included in the example above or approximating the same.

While in the foregoing description I have referred to water as the moistening agent, it will be understood of course that any of the leaching or wash solutions used in the copper extraction process may be employed for the purpose.

The moisture may be added in any suitable manner and at any suitable point prior to the actual introduction of the charge into the leaching vat. Thus, it may be introduced at the crushing plant, or between the latter and the leaching plant, or where the ore is about to be charged into the leaching tanks, depending upon where it may be done most conveniently and to the best advantage.

When, in the foregoing description and in the appended claims, I make use of the expression "to agglomerate the fines" I thereby refer to the property possessed by wetted fines of being distributed over, and becoming attached to, the coarser ore particles.

I claim:—

1. In the art of percolation-leaching of crushed oxid ores of copper containing fines, the step which comprises adding about four to five percent by weight of moisture to the ore prior to the introduction of the ore into the leaching vat.

2. In the hydrometallurgy of copper the steps which comprise crushing the ore, adding to the crushed ore containing fines about four to five percent by weight of moisture, introducing the moistened ore into the leaching vat and subjecting the moistened ore to percolation-leaching.

In testimony whereof, I affix my signature.

CARL E. CARSTENS.